Figure 1:
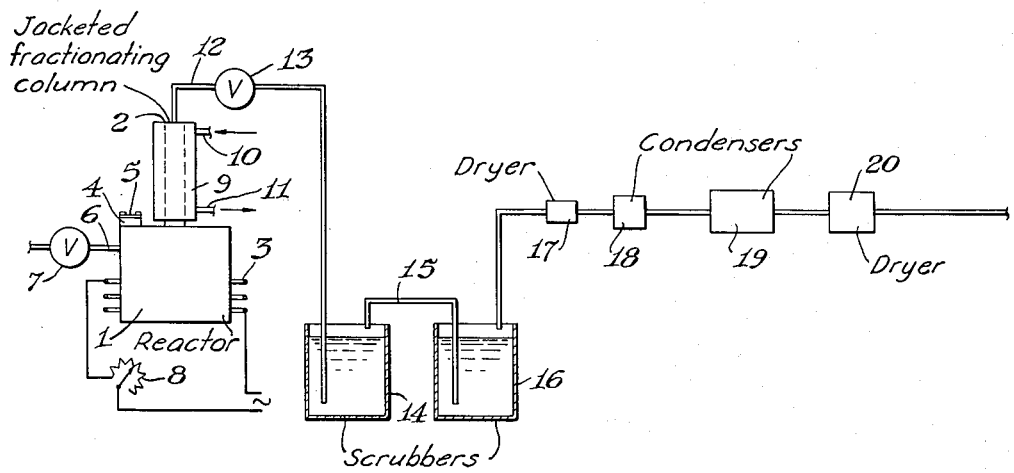

June 5, 1956 R. P. RUH ET AL 2,749,374
PRODUCTION OF METHYLENE FLUORIDE
Filed Feb. 24, 1950 2 Sheets-Sheet 1

INVENTORS.
Robert P. Ruh
BY Ralph A. Davis

Griswold & Burdick
ATTORNEYS

INVENTORS.
Robert P. Ruh
Ralph A. Davis
ATTORNEYS

United States Patent Office 2,749,374
Patented June 5, 1956

2,749,374

PRODUCTION OF METHYLENE FLUORIDE

Robert P. Ruh and Ralph A. Davis, Midland, Mich., assignors to The Dow Chemical Company, Midland, Mich., a corporation of Delaware Application February 24, 1950, Serial No. 146,141

7 Claims. (Cl. 260—653)

This invention relates to the production of methylene fluoride.

Heretofore it was known that methylene fluoride could be produced from methylene chloride by the action of a fluorine-containing antimony halide catalyst. As early as 1892 Swartz (Bull. Acad. Roy. Belg. 24, 474) disclosed the use of a pentavalent antimony halide to catalyze a similar reaction. However, it has not been known to be possible to produce methylene fluoride in high conversions. For example, if methylene chloride is subjected, at atmospheric pressure, to the action of antimony fluoride at a temperature of about 60° C., the reaction products contain about 5.5 mol per cent of methylene fluoride and about 26 mol per cent of methylene chlorofluoride, the remainder being substantially pure methylene chloride. Similarly, if such a reaction is carried out at a temperature between about 125° C. and about 130° C., and at a pressure between about 100 and about 125 pounds per square inch gauge, the reaction products contain about 11.7 mol per cent of methylene fluoride and about 11.1 mol per cent of methylene chlorofluoride. These conversions are too low for commercial exploitation of the reaction, and it is not known to be economically feasible to improve the conversion by recycling.

The principal object of the present invention is to provide an improved method for producing methylene fluoride from methylene halides by the action of a fluorine-containing antimony halide. More specific objects and advantages are apparent from the description, which illustrates and discloses, but is not intended to limit, the invention.

According to the invention methylene fluoride is produced from methylene chloride, methylene bromochloride or methylene bromide by the action thereon of a fluorine-containing antimony halide. At least 5 per cent of the antimony in the fluorine-containing antimony halide is in the pentavalent form. The reaction is carried out in a closed vessel from which only vapors are withdrawn, and only through a fractionating column open thereto. During the reaction the following variables are regulated: (1) the rate of withdrawal of fractionating column heads, (2) the rate of withdrawal of heat from the fractionating column, and (3) the rate at which heat is supplied to the reactor, so as to maintain the reactor at a temperature between 110° C. and 175° C. and at a pressure in pounds per square inch gauge, $p$, such that there is a liquid-phase methylene halide in the reactor, and such that the $\log_{10}$ of the temperature in degrees C. of the fractionating column heads is less than $0.54 \log_{10} p$ plus $0.215$.

A preferred embodiment of the invention involves conducting the fluorination by subjecting a mixture of methylene chloride and hydrogen fluoride to the action of an antimony halide.

Figure 2:
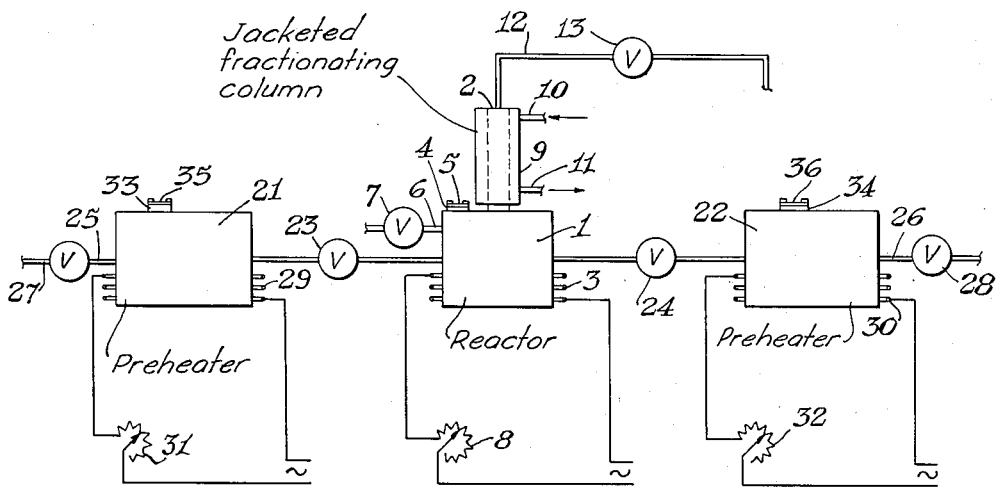
Figure 3:
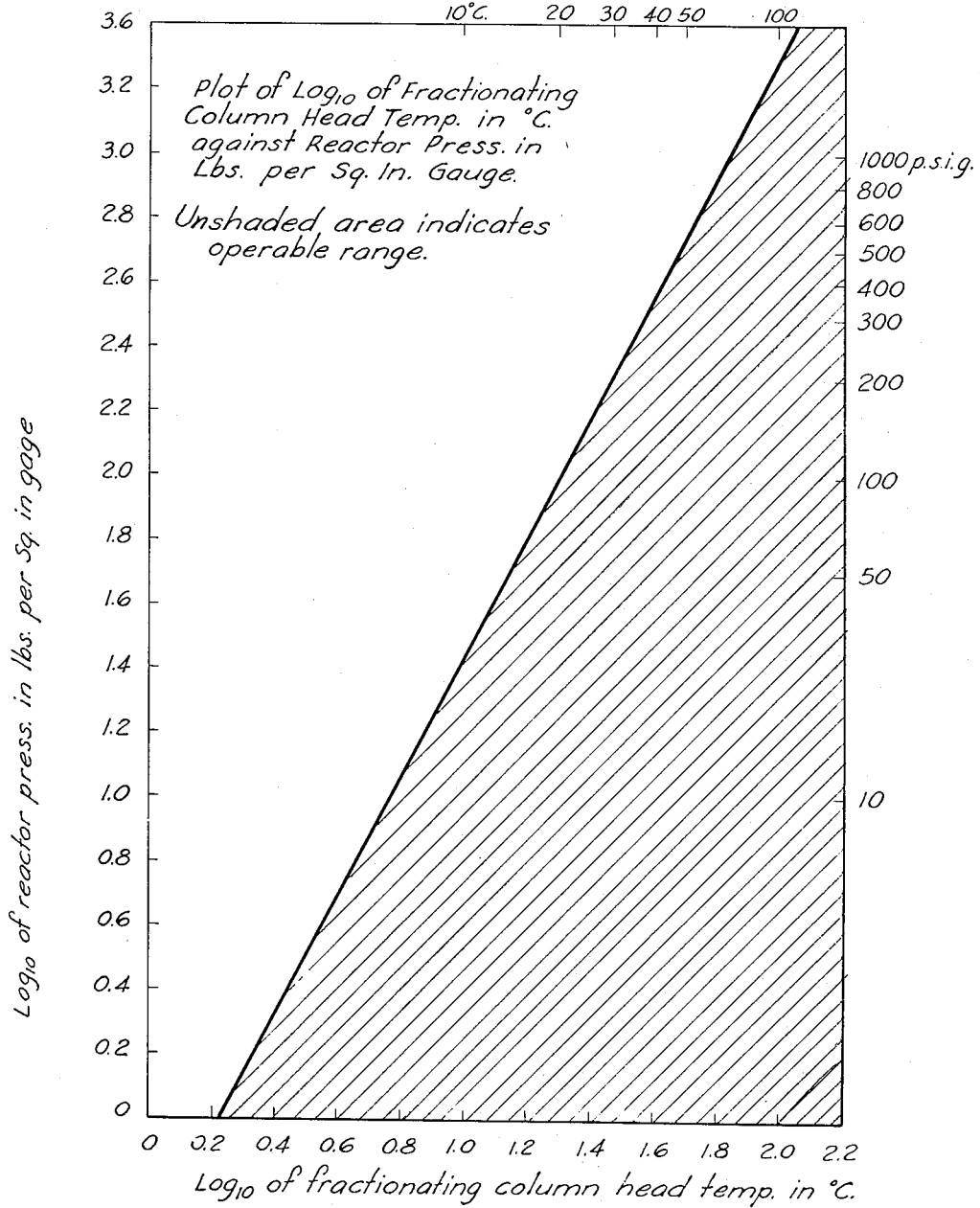

The process of the invention is illustrated by the accompanying drawings in which Fig. 1 is a diagrammatic representation of the apparatus used in a preferred method for carrying out the reaction batchwise, Fig. 2 is a diagrammatic representation of a reactor and a pair of preheaters to be used for carrying out the reaction continuously, and Fig. 3 is a plot showing the operable range of values of log of the temperature in degrees C. of the fractionating column heads and log of the reactor pressure in pounds per square inch gauge.

The apparatus illustrated in Fig. 1 comprises a reactor 1 equipped with a fractionating column 2, a heating element 3, a filling port 4 covered by a hatch 5, and an inlet tube 6 equipped with a valve 7. The rate at which heat is supplied to the reactor through the heating element is controlled by means of a rheostat 8. The fractionating column is surrounded by a jacket 9 through which a cooling medium is circulated, using an inlet 10 and an outlet 11. The top of the fractionating column is connected through a line 12 and a throttling valve 13 to a scrubber 14, which is connected through a line 15 to a second scrubber 16. The outlet from the second scrubber passes through a drier 17, and then through a pair of condensers 18 and 19, and finally through a second drier 20. To carry out a preferred embodiment of the reaction batchwise in the apparatus illustrated in Fig. 1 methylene chloride, hydrogen fluoride and an antimony halide are charged into the reactor. Heat is then supplied to the reactor through the heating elements, with the throttling valve 13 and the valve 7 closed so that no material can leave the reactor. The reactor is heated until the temperature therein is about 125° C.; when the reactor pressure is about 400 pounds per square inch gauge cooling water at about 8° C. is circulated through the fractionating column jacket, and the throttling valve 13 is opened slightly to pass gases from the reactor through the scrubbers, driers and condensers. The condenser 18 is maintained at about −20° C. and the condenser 19 is maintained at about −78° C. Any gases not condensed in the condenser 19 pass through the drier 20 and are then allowed to escape to the atmosphere.

Apparatus for carrying out a preferred embodiment of the invention that comprises conducting the reaction continuously is illustrated by Fig. 2. Fig. 2 shows the reactor, the fractionating column and the line 12 leading therefrom of Fig. 1. It shows, in addition, a pair of preheaters, 21 and 22, connected separately to the reactor, each of which is capable of being isolated therefrom by a valve 23 and 24. Each preheater is provided with an inlet tube 25 and 26 equipped with a valve 27 and 28, a heating coil 29 and 30 controlled by a rheostat 31 and 32, and an inlet port 33 and 34 fitted with a cover 35 and 36. When methylene fluoride is produced continuously in the apparatus illustrated in Fig. 2, the valves 23 and 24 are closed, and the antimony halide is charged into the reactor and heated to about 125° C. Methylene chloride and hydrogen fluoride are charged into the preheater 21 and also heated to about 125° C. The valve 23 is then opened to allow the methylene chloride and hydrogen fluoride to flow into the reactor. While the reaction is being conducted using methylene chloride and hydrogen fluoride from the preheater 21, methylene chloride and hydrogen fluoride are charged into the preheater 22 and heated to about 125° C. When the methylene chloride and hydrogen fluoride in the preheater 21 are substantially exhausted, the valve 23 is closed and the valve 24 is opened so that reaction continues with the materials from the preheater 22. The preheater 21 is then charged, so that reaction proceeds continuously.

Fig. 3 shows the operable range of fractionating column head temperature and reactor pressure. The unshaded area on Fig. 3 represents the values of fractionating column head temperature and reactor pressure at which the reaction of the invention can be carried out satisfactorily. The line bounding the shaded area was determined empirically, and represents a plot of the relationship log $t$ equals 0.54 log $p$ plus 0.215, where $t$ is fractionating column head temperature in degrees C.

The method of the invention is applicable to the fluorination of methylene halides having a molecular weight between 84 and 174. This includes methylene chloride, methylene bromochloride and methylene bromide, methylene chloride being the preferred methylene halide, for economic reasons. It is an essential feature of the method of the invention that the methylene halide be subjected, in the liquid phase, to the action of a fluorine-containing antimony halide.

As is hereinbefore indicated, the fluorinating agent is a fluorine-containing antimony halide. The fluorination can be accomplished batchwise ((1) by charging the fluorine-containing antimony halide and the methylene halide to the reactor, or (2) by charging the antimony halide, hydrogen fluoride and the methylene halide to the reactor), or continuously (by passing a mixture of hydrogen fluoride and a methylene halide through a reactor containing the antimony halide).

When fluorination is accomplished batchwise by charging the fluorine-containing antimony halide and the methylene halide to the reactor it is advantageous that the antimony halide contain from 2 to 3 atoms of fluorine per molecule of the methylene halide to be fluorinated (i. e., contain from the theoretical quantity of fluorine to a 50 per cent excess). When this method is employed it is usually advantageous that the mol ratio of antimony to methylene halide be between 0.4:1 and 1:1, and preferred that it be between 0.5:1 and 0.75:1.

When the fluorination is accomplished batchwise by charging the methylene halide, the antimony halide and hydrogen fluoride, fluorine is not provided solely by the antimony halide; in fact, an antimony halide containing no fluorine can be charged to the reactor so that all fluorine for the fluorination is provided by HF. When this method is employed it is advantageous that the ratio of total atoms of fluorine to molecules of the methylene halide be from 2:1 to 3:1. It is also desired that the mol ratio of antimony to methylene halide be between 0.2:1 and 1:1, and preferred that it be between 0.25:1 and 0.75:1. It is essential that at least a portion of the hydrogen fluoride be present in the liquid phase.

When an antimony halide, hydrogen fluoride and a methylene halide are the reactants and the reaction is conducted continuously, it is advantageous that the ratio of total atoms of fluorine to molecules of the methylene halide be from 2:1 to 3:1, and that the mol ratio of antimony to methylene halide be from 0.2:1 to 2:1; it is preferred that it be from 0.25:1 to 0.75:1. It is essential that at least a portion of the hydrogen fluoride be present in the liquid phase.

It has been found to be essential that at least 5 per cent of the antimony halide be present in the pentavalent form. The reaction proceeds if all the antimony is in the pentavalent form. If the antimony compound available contains less than 5 per cent of pentavalent antimony, a charge of chlorine or bromine is admitted to the reactor in order to convert the desired amount of antimony to its pentavalent form. This charge can be added with the methylene halide and hydrogen fluoride (if used); the conversion to the pentavalent form then takes place either before, or concurrently with, fluorination. Alternatively, the catalyst can be converted in a separate step, but this is usually economically disadvantageous.

As has been hereinbefore indicated the reaction is carried out so that log $t$ is less than 0.54 log $p+0.215$. When the reaction is run batchwise it is essential that the pressure in the reactor accumulate to at least about 400 pounds per square inch gauge before any product is removed from the reactor, and prefered that it accumulate to at least about 500 pounds per square inch gauge. Such pressure is ordinarily reached when the reactor temperature is within the range, hereinbefore indicated, in which fluorination takes place, and is sufficient to maintain at least a part of the methylene halide and hydrogen fluoride (if any) in the liquid phase. Ordinarily there is no reason to allow the pressure to accumulate to more than about 800 pounds per square inch gauge before taking off the product, and it is usually preferred not to allow the pressure to accumulate to more than about 700 pounds per square inch gauge. As a batchwise reaction proceeds the pressure in the reactor gradually decreases due to the removal therefrom of reaction products. As the pressure in the reactor decreases, however, the fractionating column head temperature can be decreased without increasing the amount of cooling agent circulated therethrough. When the reaction is conducted continuously the optimum reactor pressure is determined by the same factors that control when the reaction is conducted batchwise. Accordingly, it is advantageous to allow the pressure to accumulate as indicated above after charging a methylene halide and HF to the reactor.

It has been found to be practical to cool the fractionating column to a temperature as high as about 10° C., using ordinary water as the cooling agent. When water is the cooling agent, and a temperature between 10° C. and slightly above 0° C. is employed, it is feasible to use a fractionating column head temperature ranging from a maximum of about 45° C. to a minimum of about 15° C. It is advantageous to use a refrigerated brine to cool the fractionating column to a temperature as low as about −20° C., particularly in the early stages of reaction; however, the use of a refrigerated brine is not essential, as satisfactory results can be achieved using ordinary water.

As has been hereinbefore indicated, reaction products leave the reactor through a fractionating column. It has been found that satisfactory results can be achieved when the fractionating column is merely a jacketed tube with a cooling agent circulated through the jacket. However, better results are possible if the fractionating column is more efficient, e. g., is packed, or has plates and caps. It is usually desired that the fractionating column be open to the reactor so that it is operated substantially at the pressure thereof; otherwise, the return of material condensed in the fractionating column is difficult, if not impossible, or reaction gases do not pass into the fractionating column. Since a pressure differential exists from the bottom to the top of any fractionating column, a small pressure difference between the top of the fractionating column and the reactor is essential.

Methylene fluoride is an important organic intermediate, for example, for the production of bromodifluoromethane and dibromodifluoromethane. Preliminary tests indicate that both of these compounds have an effectiveness of the order of that of the most effective previously known fire extinguishers but have the great advantage over these compounds of being relatively non-toxic to warm blooded animals. It has been found to be feasible to carry out the vapor phase bromination of methylene fluoride (to produce both the mono- and dibromo compounds) using methylene fluoride of 95 mol per cent purity, or higher, as a starting material. By selective condensation of the gases produced by the process of the invention it is possible to recover methylene fluoride of sufficient purity for use as a starting material for the vapor phase bromination mentioned above. Selective condensation is conveniently effected by passing the reaction vapors through a preliminary condenser cooled to a temperature between about −20° C. and about −30° C. in order to remove relatively higher boiling products from the gas stream. Methylene fluoride of sufficient purity for bromination is then recovered in a condenser operated at a temperature sufficiently below the boiling point thereof to effect efficient condensation. The condenser is conveniently cooled by a solid carbon dioxide-acetone mixture which assumes a temperature of −78° C. This selective condensation is a preferred, but not an essential, aspect of the invention.

The following examples are intended to illustrate and disclose, but are not to be construed as limiting, the invention:

EXAMPLE 1

Methylene fluoride was produced from a methylene halide having a molecular weight between 84 and 174, by the action of a fluorine-containing antimony halide, according to the following procedure:

An 8.5 gallon autoclave fitted with a jacketed, open-tube fractionating column was charged with antimony trichloride (25.2 pounds) and chlorine (1.75 pounds) and stirred for 3 hours; the autoclave was then cooled to 20° C. and evacuated. Methylene chloride (37.75 pounds) and anhydrous hydrogen fluoride (21 pounds) were then added to the autoclave, and external heating thereof by means of electric heating elements was started. When the temperature in the autoclave was 85° C. (one hour after heating had started) circulation of water (between 0° C. and 10° C.) through the fractionating column jacket was started; removal of reaction products from the top of the fractionating column was then begun at a head temperature of 2° C. Reaction products removed were passed through a water scrubber and through an alkaline scrubber containing a solution of about 10 weight per cent of caustic, and then through a train of two condensers operated at —78° C. Removal of reaction products was continued; the time in hours after start of product removal, the autoclave temperature in degrees C., the autoclave pressure in pounds per square inch gauge, the log of the autoclave pressure, the fractionating column head temperature in degrees C., and the log of the fractionating column head temperature during the removal of the product are shown in Table 1, below:

Table 1

| Time in hrs. after start of product removal | Autoclave temperature in °C. | Fractionating column head temperature in °C. | Log₁₀ | Autoclave pressure in lbs./sq. in. gauge | Log₁₀ |
| --- | --- | --- | --- | --- | --- |
| 1 | 102 | 32 | 1.5052 | 350 | 2.5441 |
| 2 | 121 | 38 | 1.5798 | 500 | 2.6990 |
| 3 | 124 | 38 | 1.5798 | 525 | 2.7202 |
| 4 | 122 | 35 | 1.5441 | 510 | 2.7076 |
| 5 | 122 | 36 | 1.5563 | 505 | 2.7033 |
| 7 | 128 | 37 | 1.5682 | 525 | 2.7202 |
| 8 | 126 | 36 | 1.5563 | 490 | 2.6902 |
| 9 | 130 | 36 | 1,5563 | 470 | 2.6721 |
| 10 | 127 | 36 | 1.5563 | 410 | 2.6128 |
| 11 | 128 | 37 | 1.5682 | 375 | 2.5740 |
| 12 | 135 | 38 | 1.5798 | 370 | 2.5682 |
| 13 | 137 | 32 | 1.5052 | 270 | 2.4314 |
| 14 | 143 | 26 | 1.4150 | 180 | 2.2553 |
| 15 | 146 | 17 | 1.2304 | 105 | 2.0212 |

Reference to Fig. 3 will readily show that the reactor pressure and head temperature are within the operable range throughout this run. After removal of products was discontinued, the autoclave was allowed to cool to room temperature, and methylene chloride (one pound) was recovered therefrom. The product collected in the condensers amounted to 22.4 pounds, and was found to contain fluoroform (1.9 weight per cent), methylene fluoride (83.1 weight per cent) methylene chloro-fluoride (3.2 weight per cent) and recovered methylene chloride (11.8 weight per cent).

EXAMPLE 2

The equipment described in Example 1 was used to produce methylene fluoride from methylene chloride (8500 grams), antimony trifluoride (13,320 grams) and antimony pentachloride (1,332 grams). The starting materials were charged into the autoclave and heating was initiated. When the temperature in the autoclave was 132° C. (3¾ hours after heating had started) circulation of water (between 0° C. and 10° C.) through the fractionating column jacket was initiated. Removal of reaction products from the top of the fractionating column was then started at a head temperature of 12.5° C. and a reactor pressure of 410 pounds per square inch gauge. Reaction products removed were scrubbed and collected as described in Example 1. Table 2, below, shows the time in hours, after the beginning of product removal, autoclave temperature in degrees C., autoclave pressure in pounds per square inch gauge, log of autoclave pressure, fractionating column head temperature in degrees C., and log of the fractionating column head temperature.

Table 2

| Time in hrs. after start of product removal | Autoclave temperature in °C. | Autoclave pressure in lbs./sq. in. gauge | Log₁₀ | Fractionating column head temperature in °C. | Log₁₀ |
| --- | --- | --- | --- | --- | --- |
| 1 | 127 | 390 | 2.5911 | 14 | 1.1461 |
| 2 | 130 | 410 | 2.6128 | 13 | 1.1139 |
| 3 | 127 | 358 | 2.5539 | 39 | 1.5911 |
| 4 | 126 | 335 | 2.5250 | 38 | 1.5798 |
| 5 | 130 | 330 | 2.5185 | 38 | 1.5798 |
| 6 | 130 | 325 | 2.5119 | 39 | 1.5911 |
| 7 | 130 | 300 | 2.4771 | 37 | 1.5682 |
| 8 | 130 | 305 | 2.4843 | 37 | 1.5682 |
| 9 | 133 | 240 | 2.3802 | 32 | 1.5052 |
| 10 | 134 | 130 | 2.1139 | 23 | 1.3617 |

Reference to Fig. 3 will readily show that reactor pressure and head temperature are within the operable range throughout this run. After removal of products was discontinued, the autoclave was allowed to cool to room temperature, and methylene chloride (302 grams) was recovered therefrom. The product collected in the condensers amounted to 4,917 grams, and was found to contain 4,615 grams of methylene fluoride and 252 grams of methylene chloride.

We claim:

1. An improved method of producing methylene fluoride that comprises heating together in a closed zone at a temperature maintained between 110° and 175° C. under autogeneous pressure a mixture essentially comprising a methylene halide having a molecular weight between 84 and 174 and a fluorine-containing antimony halide of which at least 5 per cent of the antimony is in the pentavalent form and providing from 2 to 3 atoms of fluorine per molecule of the methylene halide, passing vapors from the zone into a superposed openly-communicating reflux fractionating zone cooled by indirect heat transfer to a temperature $t$ (in degrees centigrade) between 15° and 45° C. into countercurrent contact with condensate forming therein and refluxing to the heating zone, bleeding uncondensed vapor from the top of the fractionating zone at a rate such as to maintain the autogeneous pressure $p$ (in pounds per square inch gauge) in the heating zone at a value sufficiently high to maintain methylene halide therein in the liquid phase and to satisfy the relation $\log t < 0.54 \log p + 0.215$, and recovering methylene fluoride from the vapor thus bled from the system.

2. A method according to claim 1 in which a fluorine-containing antimony halide containing from 2 to 3 atoms of fluorine per molecule of the methylene halide is the sole source of fluorine.

3. A method as claimed in claim 1 in which a fluorine-containing antimony halide is formed in the reaction zone by the action of hydrogen fluoride charged thereto on an antimony halide of molecular weight greater than 227.

4. An improved method of producing methylene fluoride that comprises heating together in a closed zone at a temperature maintained between 115° and 150° C. and under autogeneous presure a mixture of hydrogen fluoride, a methylene halide having a molecular weight between 84 and 174, and a fluorine-containing antimony halide of which at least 5 per cent of the antimony is in the pentavalent form, the said reactants being in such proportions that the ratio of total atoms of fluorine to molecules of methylene halide is between 2:1 and 3:1, passing vapors from the zone into a superposed openly-communicating reflux fractionating zone cooled by indirect heat-transfer to a temperature $t$ (in degrees centigrade) between 15° and 45° C. into countercurrent contact with condensate forming therein and refluxing to the heating zone, bleeding uncondensed vapor from the top of the fractionating zone at a rate such as to maintain the autogeneous pressure $p$ (in pounds per square inch gauge) in the heating zone at a value sufficiently high to maintain liquid phase methylene halide and hydrogen fluoride therein and to satisfy the relation log $t<0.54$ log $p+0.215$, and recovering methylene fluoride from the vapor thus bled from the system.

5. A method according to claim 4 in which the mol ratio of antimony to methylene halide is between 0.2:1 and 2:1.

6. A method according to claim 5 in which the methylene halide is methylene chloride and the mol ratio of antimony thereto is between 0.25:1 and 0.75:1.

7. An improved method of producing methylene fluoride that comprises heating together in a closed zone at a temperature maintained between 110° and 175° C. under autogeneous pressure a mixture essentially comprising methylene chloride and a fluorine-containing antimony halide of which at least 5 per cent of the antimony is in the pentavalent form and providing from 2 to 3 atoms of fluorine per molecule of the methylene halide, passing vapors from the zone into a superposed openly-communicating reflux fractionating zone, cooled by indirect heat-transfer to a temperature $t$ (in degrees centigrade) between 15° and 45° C. into countercurrent contact with condensate forming therein and returning to the zone, maintaining the system closed until autogeneously developed pressure reaches at least 400 pounds per square inch gauge, thereafter bleeding uncondensed vapor from the top of the fractionating zone at a rate such as to maintain the autogeneous pressure $p$ (in pounds per square inch gauge) at a value about 105 pounds sufficiently high to maintain methylene chloride therein in the liquid phase and to satisfy the relation log $t<0.54$ log $p+0.215$, and separating methylene fluoride from the vapor thus bled from the system.

References Cited in the file of this patent

UNITED STATES PATENTS

| | | |
|---|---|---|
| 2,005,711 | Daudt et al. | Jun. 18, 1935 |
| 2,005,713 | Holt et al. | Jun. 18, 1935 |
| 2,007,208 | Midgley et al. | July 9, 1935 |
| 2,013,062 | Midgley et al. | Sept. 3, 1935 |